United States Patent
Rzehak et al.

(10) Patent No.: US 10,931,530 B1
(45) Date of Patent: Feb. 23, 2021

(54) MANAGING ROUTING RESOURCES OF A NETWORK

(71) Applicant: Amazon Technologies, Inc., Seattle, WA (US)

(72) Inventors: Maciej Rzehak, Warsaw (PL); Amit Sahoo, San Carlos, CA (US); Ryan Shaw, Seattle, WA (US); Stepen Callaghan, Kildare (IE); Alan Michael Judge, Dublin (IE); Mitchell Bernard Skiba, Mountain View, CA (US); Leonard Thomas Tracy, Bothell, WA (US); Mark Noel Kelly, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/633,374

(22) Filed: Jun. 26, 2017

(51) Int. Cl.
*H04L 12/24* (2006.01)
*H04L 12/721* (2013.01)
*H04L 12/26* (2006.01)

(52) U.S. Cl.
CPC .......... *H04L 41/0896* (2013.01); *H04L 41/08* (2013.01); *H04L 45/38* (2013.01); *H04L 43/0888* (2013.01)

(58) Field of Classification Search
CPC ....................................................... H04L 45/52
See application file for complete search history.

(56) References Cited

U.S. PATENT DOCUMENTS

| | | | | |
|---|---|---|---|---|
| 7,672,331 B1* | 3/2010 | Cortez | ................ | H04L 41/0896 370/468 |
| 8,279,754 B1* | 10/2012 | Minei | ................ | H04L 41/0896 370/230 |
| 8,665,748 B2* | 3/2014 | Jenne | ..................... | H04L 12/12 370/254 |
| 9,923,798 B1* | 3/2018 | Bahadur | ................ | H04L 45/00 |
| 2004/0139179 A1* | 7/2004 | Beyda | ..................... | H04L 45/02 709/221 |
| 2008/0281947 A1* | 11/2008 | Kumar | ................ | H04L 41/0806 709/220 |
| 2010/0014424 A1* | 1/2010 | Agrawal | ................ | H04L 41/12 370/235 |
| 2012/0093154 A1* | 4/2012 | Rosenberg | ............. | H04L 45/04 370/392 |
| 2014/0219081 A1* | 8/2014 | Natarajan | ........... | H04L 41/0659 370/228 |

\* cited by examiner

*Primary Examiner* — Kevin M Cunningham
(74) *Attorney, Agent, or Firm* — Klarquist Sparkman, LLP

(57) ABSTRACT

The following description is directed to managing routing resources of a communication network. In one example, a method can include determining an amount of routing capacity from a network device and toward a routing prefix. An attribute associated with the routing prefix can be modified based on the amount of routing capacity toward the routing prefix. The modified attribute associated with the routing prefix can be announced to a peer of the network device.

18 Claims, 11 Drawing Sheets

MANAGING ROUTING RESOURCES OF A NETWORK

BACKGROUND

Cloud computing is the use of computing resources (hardware and software) which are available in a remote location and accessible over a network, such as the Internet. In some arrangements, users are able to buy these computing resources (including storage and computing power) as a utility on demand. Cloud computing entrusts remote services with a user's data, software and computation.

Large computer systems, including cloud computing facilities (e.g., data centers), can include many compute resources connected by an internal communications network. The network can include many network components or devices that may be in different operational states during the operational lifetime of the computing facility. For example, routers and/or network links can fail or be taken off-line for upgrades or maintenance. As another example, new resources can be deployed to the network to add capacity and/or capabilities to the network. The compute service provider may desire to provide high availability and throughput through the network, even as network components fail or are upgraded or reconfigured.

DETAILED DESCRIPTION

Overview

Figure 1:
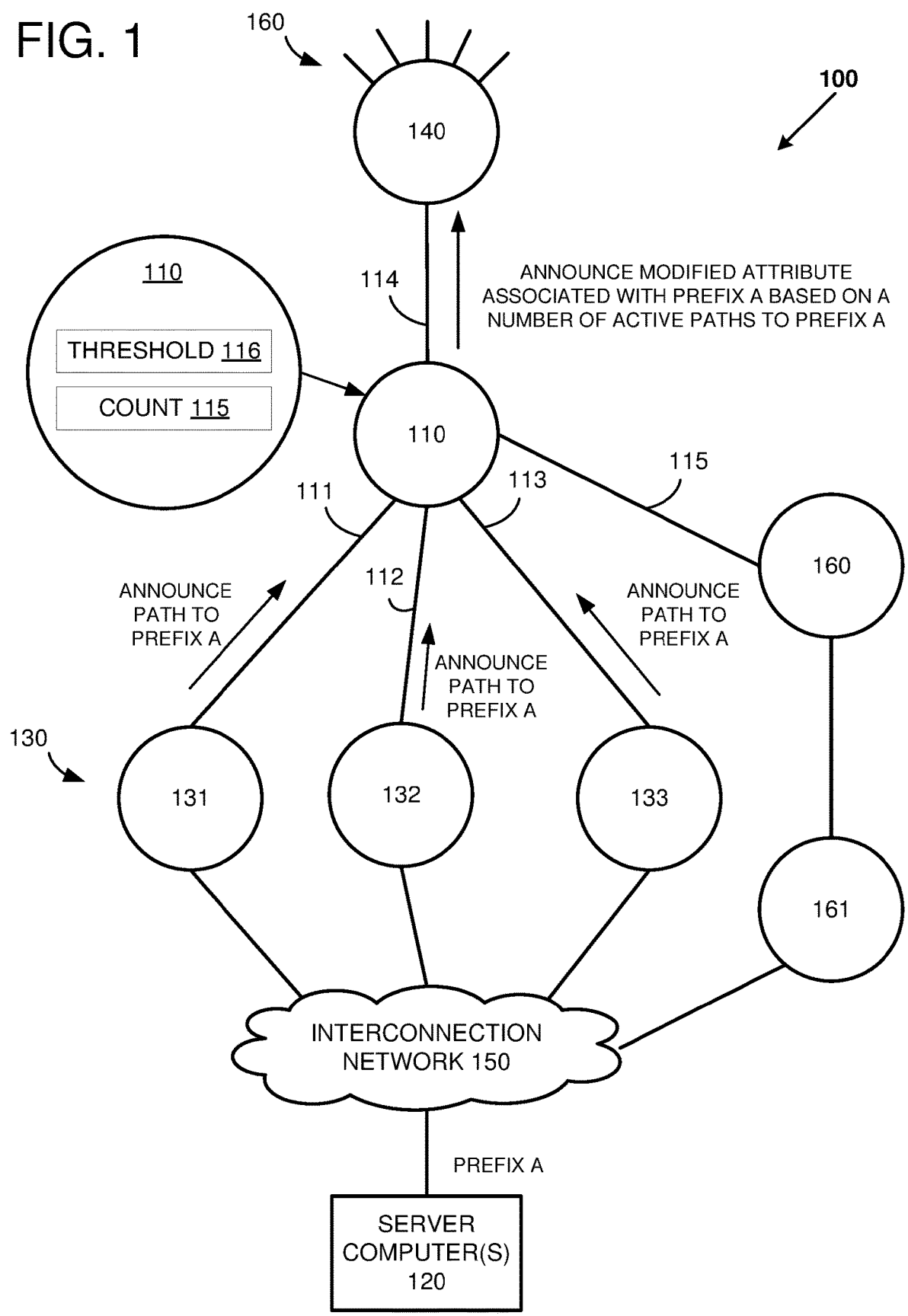
FIG. 1 is a system diagram showing an example of a system for managing routing resources of a network.

Large computer systems can include many compute resources connected by an internal communications network. Computer networks generally comprise various interconnected computing devices that can communicate with each other via packets to exchange data. When small numbers of devices are interconnected, the devices can be directly connected to each other. For example, one device can be directly connected to another device via a network link and the devices can communicate by sending packets to one another over the network link. However, direct connections between large numbers of devices is generally not scalable. Thus, the connections between large numbers of devices will typically be via indirect connections. For example, one device can be connected to another device via an interconnection network comprising one or more routers.

Large routers for connecting many devices together can be expensive. However, large routers can be constructed from lower cost commodity equipment interconnected as a network fabric. A network fabric can include multiple nodes interconnected by multiple network links. A node can include a network device that can originate, transmit, receive, forward, and/or consume information within the network. For example, a node can be a router, a switch, a bridge, an endpoint, or a host computer. The network fabric can be architected or organized in various ways which can be described by a topology of the network. Specifically, the topology of the network can describe the connectivity of the nodes and links of the communication system. As one example, the network fabric can be organized as a hierarchy of interconnected components. In particular, the network devices can be organized by rows or tiers. The network devices within a tier are generally not directly connected to each other, and the network devices within a given tier can be fully or partially connected to a neighboring tier. Thus, the different devices within a tier can provide redundant connections to a neighboring tier to potentially increase bandwidth and/or availability between the tiers. Additionally or alternatively, the network devices can be grouped into logical devices. For example, the network devices can be grouped into logical devices that describe the connectivity of the devices within the group. Exemplary logical devices can include multi-tier architectures such as Clos, folded-Clos, fat-tree, leaf-spine, butterfly, flattened-butterfly, and dragonfly networks. By grouping the individual network devices into larger logical devices and/or tiers, the architecture of the overall network can be more readily discernable to a network engineer and the network devices within a logical device can be managed as a group.

Redundant paths through a network fabric can increase the capacity through the network. As a specific example, having three parallel paths of equal capacity can potentially triple the amount of traffic that can be sent between two different endpoints connected by the three parallel paths compared to having a single path connecting the two different endpoints. The parallel paths can be provided by a Clos-type network where links between adjacent tiers are connected using a full or partial mesh. Routing protocols can be used to determine the connectivity between the different nodes of the network, but the protocols may not treat the parallel paths as a group or identify the effective capacity between the nodes through the parallel paths. Additionally, information about failures in downstream links or nodes can be relatively slow to propagate through a fabric when using a traditional routing protocol. The iterative propagation of routing information due to a downstream node or link failure can be referred to as path hunting or path exploration. When a failure occurs, the updated routing information can propagate across the network so that at any given time, some devices have accurate information and some devices have outdated information. The number of iterations needed until all of the routing information is updated can increase as the number of parallel paths increase in the network fabric. In the transient state as routing information is being updated, network packets can be inadvertently forwarded along paths with outdated routing information which can cause the network packets to be dropped or delayed.

As described herein, the routing resources of a network fabric can be managed to potentially reduce a number of iterations for updating routing information due to path exploration and to potentially increase operational efficiency of a network fabric. As one example, a routing protocol can be used to announce attributes associated with a given routing prefix (such as to a particular endpoint of the network). The attribute associated with the routing prefix can be based on a comparison of an amount of capacity toward the prefix and a threshold amount of capacity toward the prefix. The amount of capacity can be measured as a number of active paths to the prefix, so that the attribute associated with the routing prefix is based on a comparison of a number of active paths to the prefix and a threshold number of paths to the prefix. An active path is a path that will be selected by a network device for packets to the prefix. The active path(s) can be selected by the network device based on rules and/or policy of the network device and/or network (such as a lowest-cost path) and can be different from a valid path that can be used to reach the prefix but is not likely to be selected to send the packet. For example, the active paths can be the most favored paths as determined using the rules and/or policy of the network device. There can be multiple active paths to a prefix from a given network device, such as when there are parallel paths of equal weight from the network device and to the prefix (such as when an ECMP routing policy is used to route across a mesh). The attribute associated with the prefix can indicate a preference for a given path. As a specific example, the attribute can indicate a reduced preference for using a network device as a next-hop for a particular prefix when the number of active paths is less than the threshold number of paths. In this manner, over-subscription ratios of a network fabric can potentially be controlled with a per-prefix granularity in real-time. This control can potentially eliminate a broad set of detrimental failure modes that might require external system action in order to reduce the risk of dropped packets in the network fabric during transient network events.

Example Architectures for Managing Routing Resources of a Network

Figure 2:
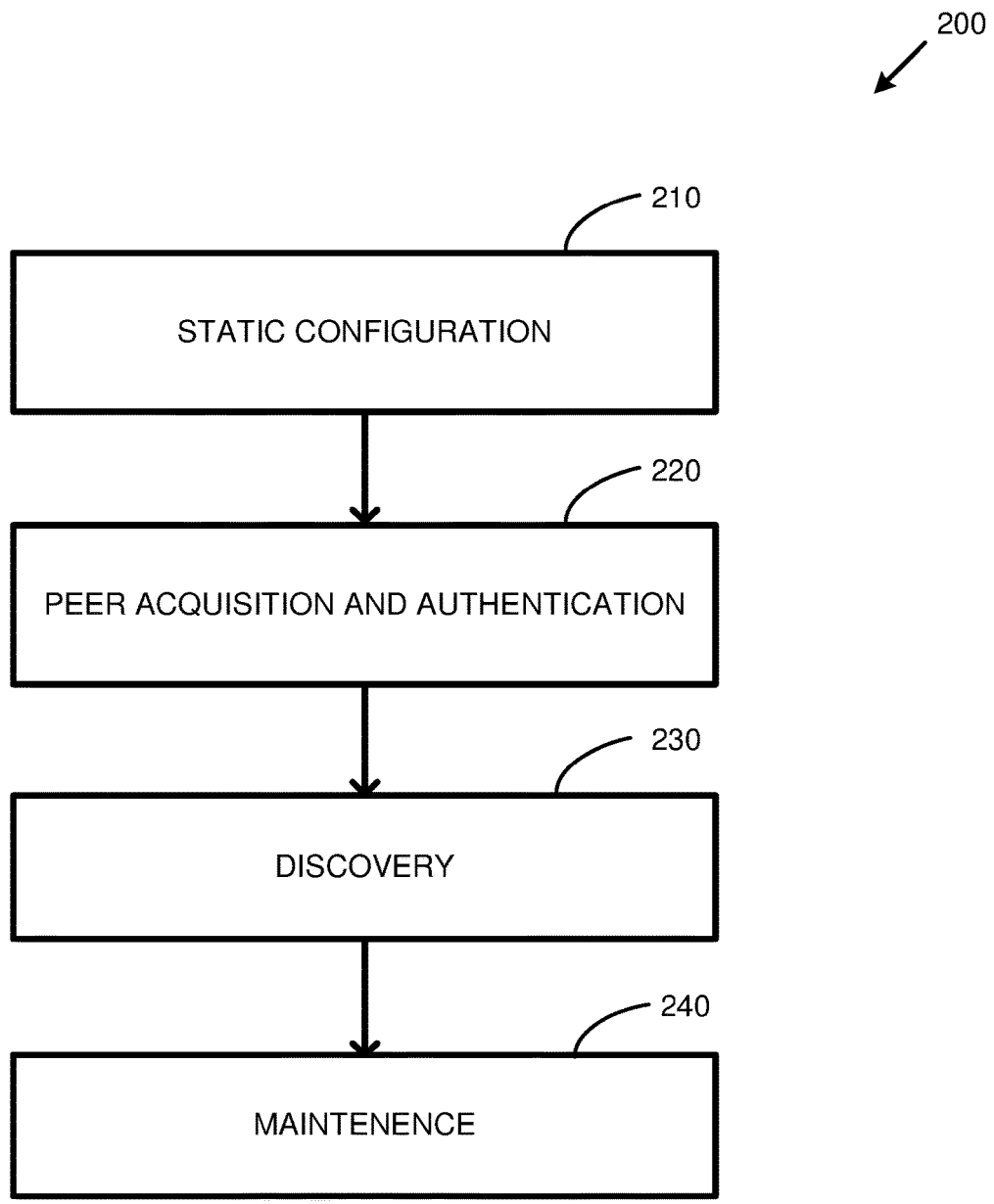
FIG. 2 is a flow diagram of an example method of configuring and managing network devices of a network.
Figure 3:
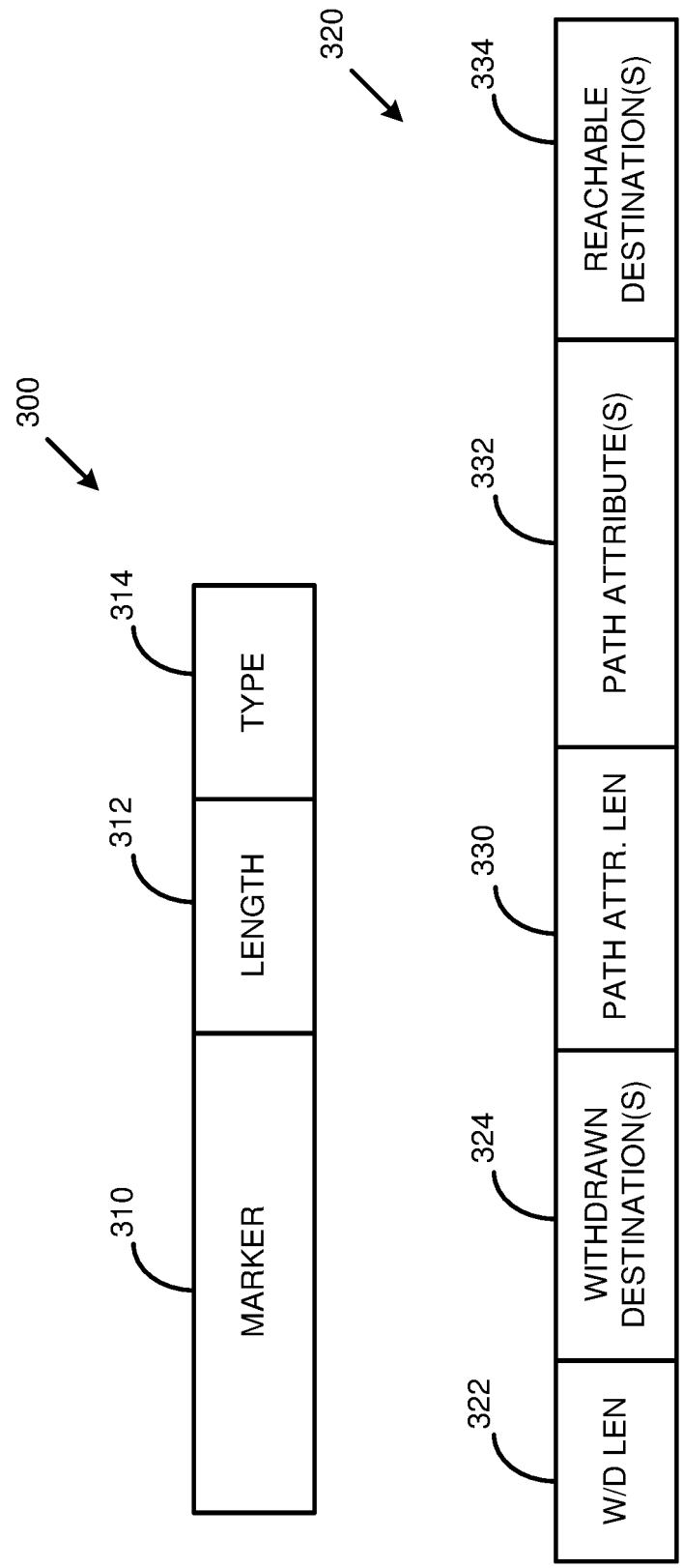
FIG. 3 illustrates an example routing protocol packet format.
Figure 4:
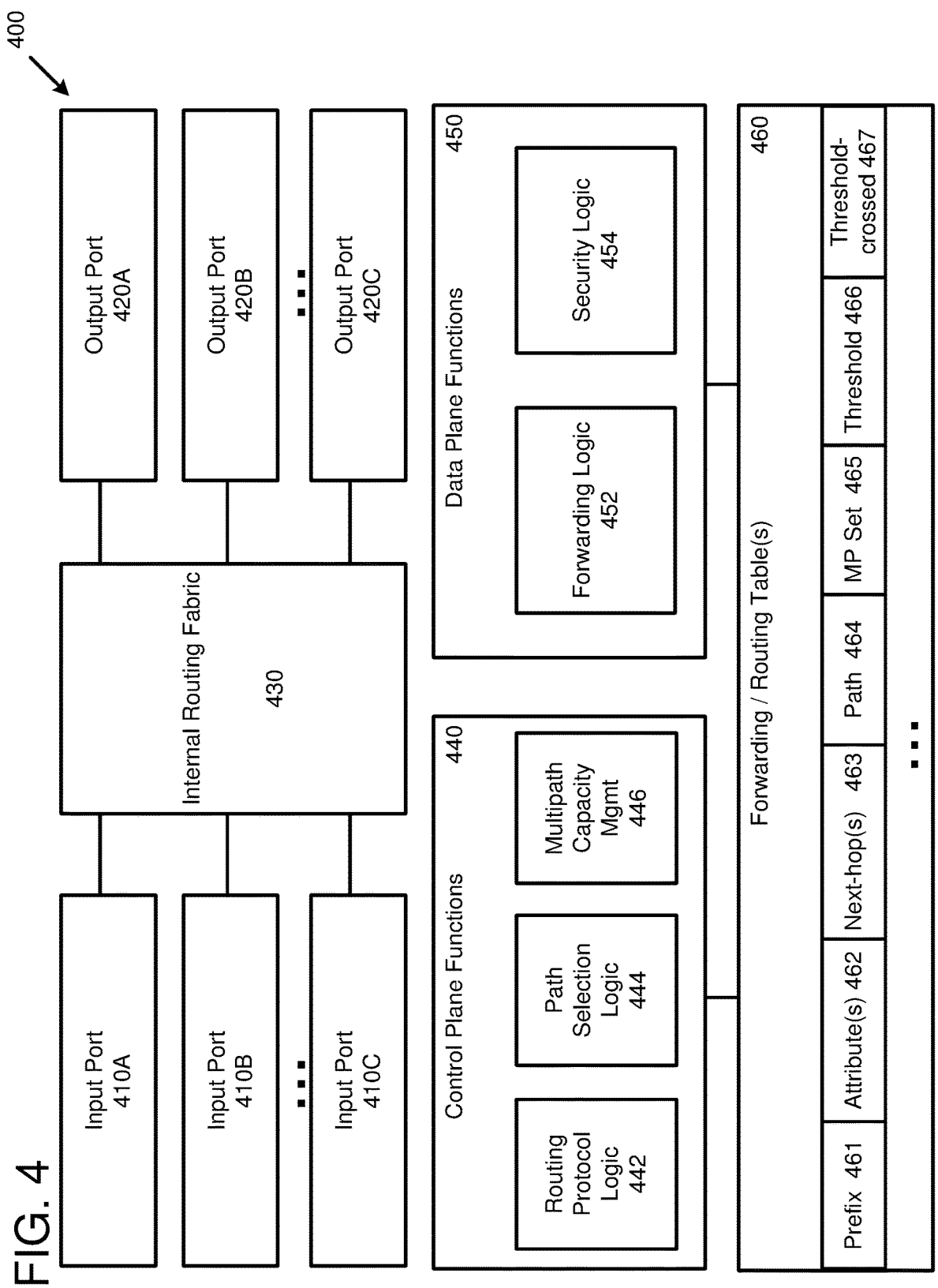
FIG. 4 is a system diagram showing an example of a network device.
Figure 5:
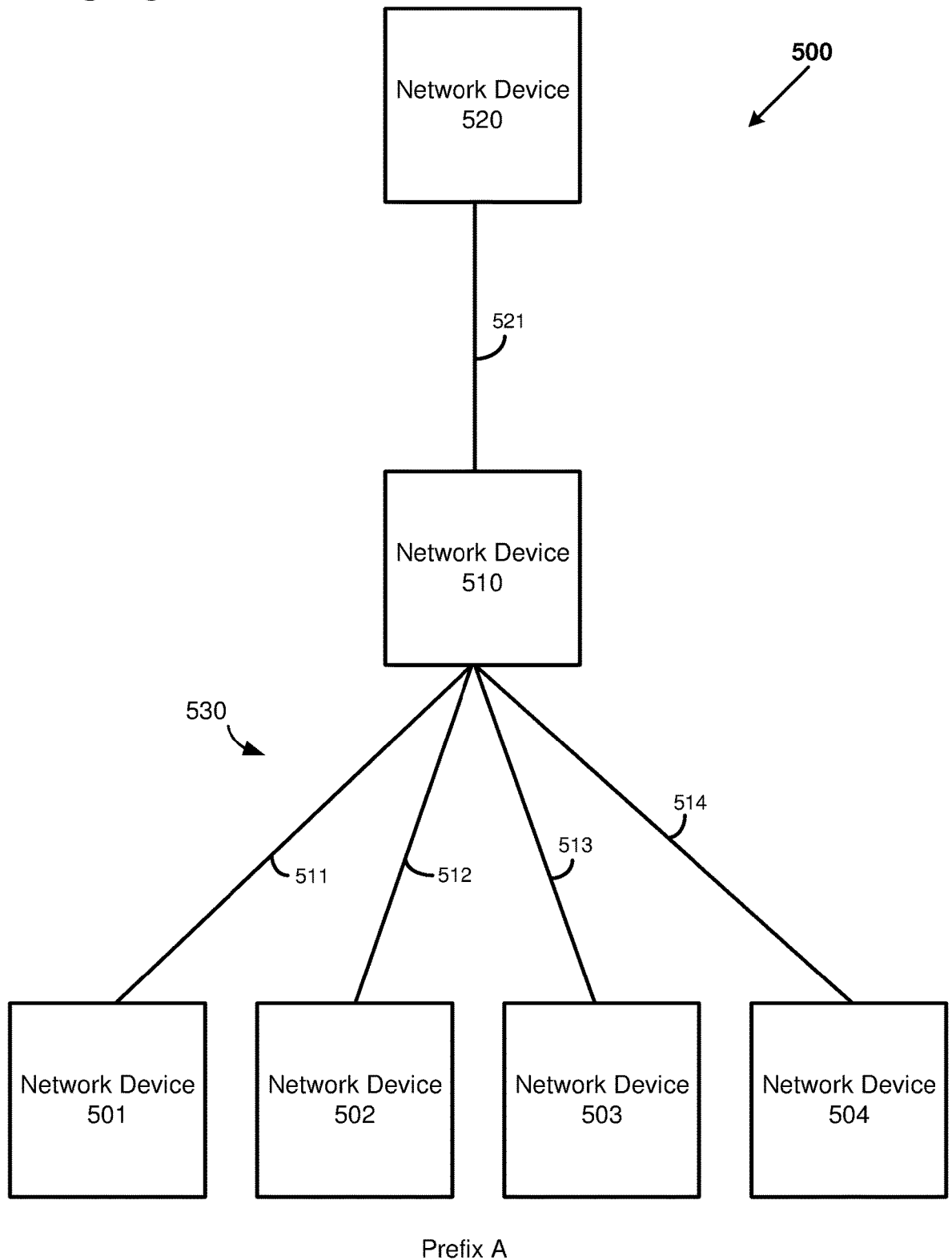
FIG. 5 illustrates an example network including a network device connected to multiple peer devices that have a path to a given routing prefix.
Figure 6:
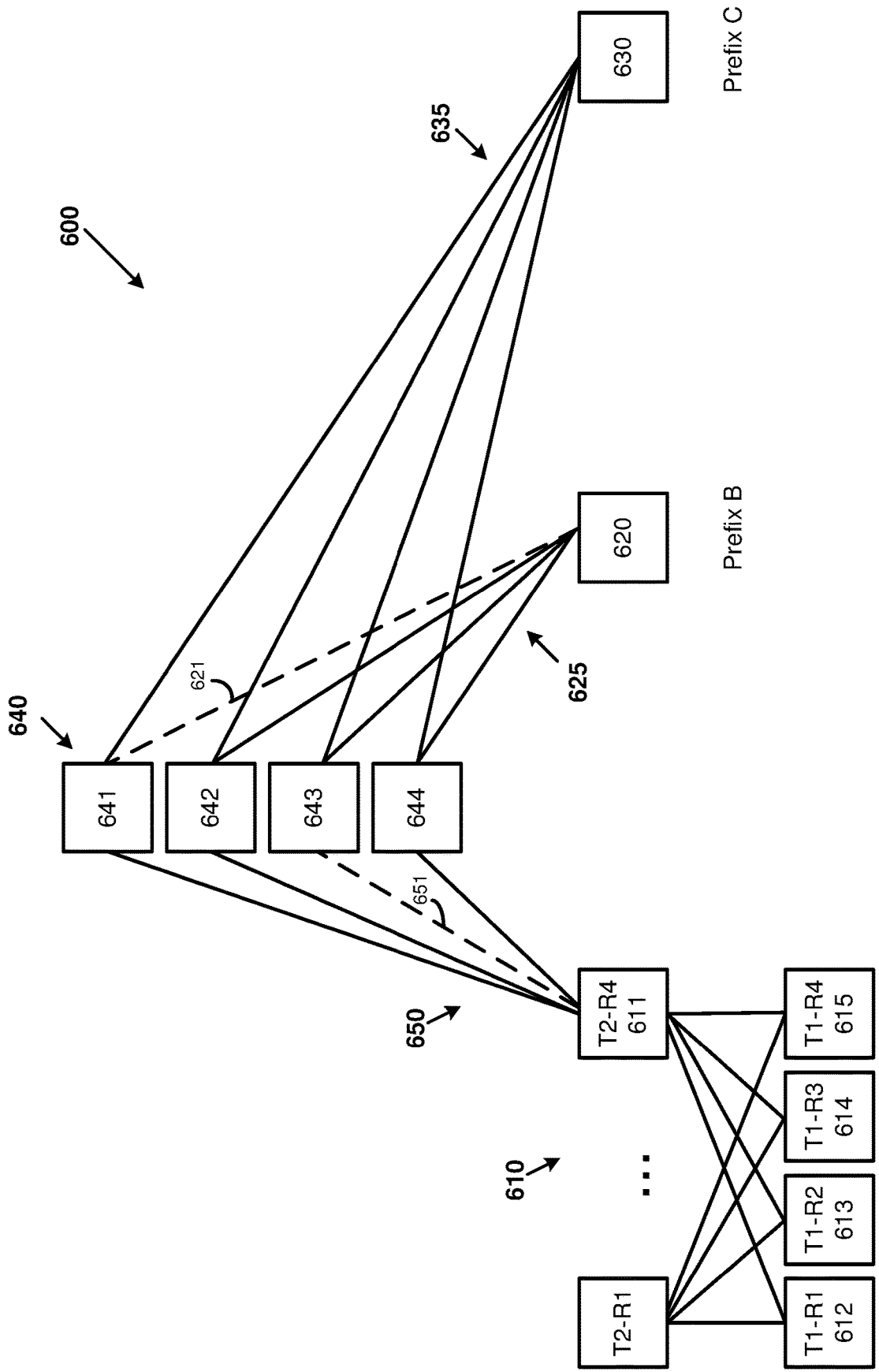
FIG. 6 illustrates another example network including a network device connected to multiple peer devices that have a path to a given routing prefix.
Figure 7:
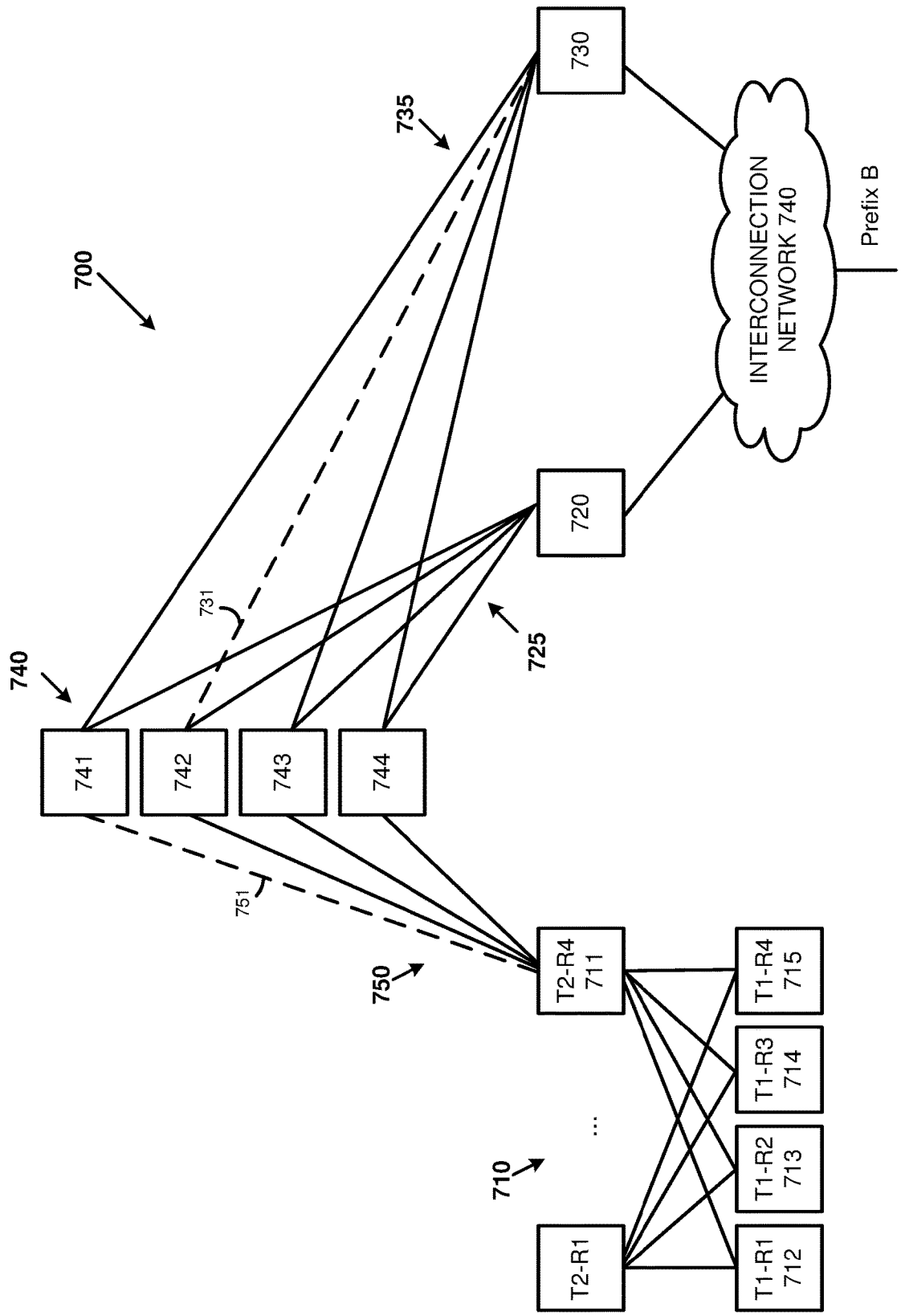
FIG. 7 illustrates another example network including a network device connected to multiple peer devices that have a path to a given routing prefix.

FIGS. 1-7 illustrate various aspects of an architecture for managing routing resources of a network. FIG. 1 illustrates a system for managing routing resources of a network. The network can include network devices participating in a routing protocol. For example, the routing protocol can be a distance-vector or a path-vector protocol that uses update packets to announce reachability and/or attributes for a given routing prefix. Specifically, each network device can determine an amount of capacity toward a routing prefix and adjust an attribute associated with the routing prefix based on a comparison of the amount of capacity to a threshold amount of capacity. FIG. 2 illustrates an example flow diagram for implementing the routing protocol. FIG. 3 illustrates example packet formats that can be used for the update packets of the routing protocol. FIG. 4 illustrates an example microarchitecture of a network device that can be used as a routing resource of the network. FIGS. 5-7 illustrate specific examples of how routing information can be propagated through the network in response to various transient network events.

FIG. 1 is a system diagram showing an example of a system 100 for managing routing resources of a network. The system 100 includes a network for forwarding network packets between different nodes of the network and different endpoints connected to the network. The network includes the interconnection network 150 and network devices 110, 131-133, 140, and 160-161. The network device 110 is connected to the network device 140 by a link 114. The network devices 131-133 can be arranged in a tier 130 that has links 111-113 to the network device 110. The active paths from the network device 110 to the prefix A can include the links 111-113. A valid but non-active path from the network device 110 to the prefix A can include the link 115 (e.g., the path including link 155 can be disfavored because there is a longer path (more hops) to the interconnection network 150). The interconnection network 150 can include one or more network devices connected in various topologies and can be connected to the tier 130 and to one or more server computers 120. Thus, network packets can be transmitted from the one or more server computers 120 through the network to the network device 140 and to other network devices and/or endpoints (not shown) connected via the links 160 of the network device 140.

Nodes and endpoints of the network can be identified using an address assigned to each of the respective nodes and endpoints. Packets can be identified as originating at the server computers 120 using an address (e.g., a source address) within the respective packets. Packets can be sent to the server computers 120 using an address (e.g., a destination address) within the respective packets. As a specific example, the address can be a 32-bit number that is generally written using dot-decimal notation, where each eight bit portion is written as a decimal number and there is a decimal point placed between the eight bit numbers. For example, a server computer can be assigned the address 128.96.128.0. Individual nodes of the network can be assigned one or more addresses and groups of nodes or endpoints can be assigned a range of addresses. A range of addresses can be referred to as a subnet and the subnet can be identified by its routing prefix. For example, a range of addresses can be written using Classless Inter-Domain Routing (CIDR) notation. As a specific example, "128.96.128.0/24" is CIDR notation referring to a range of addresses with a routing prefix of 24 address bits having the value 128.96.128, and all of the addresses between 128.96.128.0 and 128.96.128.255 are within the subnet.

The paths between the different nodes and endpoints of the network can be discovered using a distributed routing protocol. For example, each of the network devices of the network can announce destinations that are reachable from a network device. As a specific example, the network device 131 can announce that there is a path to prefix A (e.g., to server computers 120) by sending an update packet to the network device 110 over the link 111. The announcement can indicate that the path to prefix A is through the interconnection network 150 and can also indicate any attributes associated with the prefix A. Similarly, the network device 132 can announce that there is a path to prefix A by sending an update packet to the network device 110 over the link 112, and the network device 133 can announce that there is a path to prefix A by sending an update packet to the network device 110 over the link 113. After the network device 110 receives at least one of the update packets from the network devices 131-133, the network device 110 can send an update packet to the network device 140 announcing that the prefix A is reachable through the network device 110.

When discovery is complete and the network is in a steady state condition, there are three parallel paths from the network device 110 to the server computers 120 at prefix A. Specifically, one path is through link 111 and the network device 131, a second path is through the link 112 and the network device 132, and the third path is through the link 113 and the network device 133. When the links 131-133 are capable of carrying equal capacity, the parallel paths are architected to provide three times the capacity of a single link. Thus, the amount of traffic forwarded through the network device 110 to prefix A can potentially be three times the capacity of a single link (e.g., the traffic to prefix A can be oversubscribed by the extra carrying capacity of the parallel paths compared to the carrying capacity of a single link). However, one or more of the architected paths may not be operational due to failed components and/or transient conditions (e.g., the discovery is still in progress) of the network. When the architected paths are greater than the operational active paths, the network traffic can become congested causing packets to potentially get dropped.

However, potential bottlenecks in the network can be identified so that traffic can be rerouted around the bottlenecks. For example, the network device 110 can track an amount of capacity to each prefix that is reachable through the network device 110. In particular, the network device 110 can measure a number of active paths to a given prefix (e.g., prefix A) and store the number of active paths in a field of a data structure (e.g., count 115). The number of active paths can be measured by counting a number of sources (e.g., the network devices 131-133) of update packets announcing a path to the given prefix, and determining which of the paths are preferred according to routing policies of the network device and/or network. For example, the set of active paths can include the paths determined to be the most preferred or best (e.g., the lowest cost) paths toward the prefix. The network device 110 can also be configured with a threshold number of active paths that are desired for a given prefix. Specifically, the threshold number can be stored in a field of a data structure (e.g., threshold 116). The number of active paths can be compared to the threshold number of active paths and the network device 110 can perform different actions based on a result of the comparison. For example, announcements associated with the given prefix can be blocked, delayed, and/or annotated with information based on the result of the comparison. As one example, the reachability of a given prefix can be delayed and/or blocked when discovery is beginning and the number of active paths is less than the threshold number active paths. In particular, the threshold 116 for prefix A can be set to two active paths. When the network device 110 receives the first announcement from the network device 131 (and before any announcements from the network devices 132 and 133), the count 115 can be incremented to one, and an announcement of the reachability of prefix A can be blocked from the network device 110 because the number of active paths is less than the threshold number of active paths. Alternatively, when the network device 110 receives the first announcement from the network device 131, the network device 110 can announce the reachability of prefix A to the network device 140, and the announcement can include an attribute indicating that the number of active paths is less than the threshold number of active paths. The attribute can be used by the network device 140 to reduce a preference for sending traffic destined for prefix A through the network device 110 (also referred to as de-preferencing the network device 110 for traffic destined for prefix A). When a second announcement is received by the network device 110 (e.g., from the network devices 132 or 133), the count 115 can be incremented to two, and an announcement of the reachability a prefix A can be sent from the network device 110 to the network device 140 because the number of active paths is equal to the threshold number of active paths. If the network device 110 sent an earlier announcement to the network device 140 indicating that the number of active paths was less than the threshold number of active paths, then the new announcement can modify the attribute to indicate that the number of active paths is greater than or equal to the threshold number of active paths. If the number of active paths transitions from at or above to below the threshold number of active paths during the operation of the network, the network device 110 can send an announcement to the network device 140 with a modified attribute for the prefix indicating that the number of active paths is less than the threshold number of active paths. Thus, the network device 140 can be informed about more than just mere reachability of the prefix A. Specifically, the network device 140 can be explicitly informed of whether there is a route through the network device 110 to the prefix A with a guaranteed amount of capacity (e.g., a multi-path route having the threshold number of active paths) by sending an update packet with the attribute that signals whether the route is more preferred or less preferred. Additionally, the network device 140 can be implicitly informed of whether there is a route through the network device 110 to the prefix A with a guaranteed amount of capacity by changing mandatory attributes that disable the route to the prefix A.

FIG. 2 is a flow diagram of an example flow 200 of a routing protocol for configuring and managing network devices of a network. The routing protocol can be implemented at various levels of the Open Systems Interconnection (OSI) model. As a specific example, the routing protocol can be implemented at the application layer of the OSI model.

The OSI model standardizes and partitions the internal functions of a communication system into abstraction layers. In particular, the OSI model standardizes and partitions a communication system into seven layers. A particular layer provides a communication path with the layers adjacent (e.g., a layer above and a layer below) to the particular layer. The lowest layer is the physical layer (referred to as layer 1) which defines the electrical and physical specifications for communication over a physical transmission medium. Specifically, the physical layer can define voltage levels, signal timing, transmission media (e.g., electrical cables, fiber-optic cables, radio frequencies), and so forth. The physical layer can provide a communication path with the data link layer or link layer (referred to as layer 2). The link layer defines the protocols for transferring data between two nodes. Additionally, the link layer can define protocols for establishing and terminating connections between nodes, managing flow control, and detecting and/or correcting errors occurring on the physical layer. Examples of link layer protocols are Ethernet, Asynchronous Transfer Mode (ATM), Point-to-Point Protocol (PPP), High-level Data Link Control (HDLC), Fiber Distributed Data Interface (FDDI), and Token Ring. The link layer can provide a communication path with the network layer (referred to as layer 3). Examples of network layer protocols are Internet Protocol (IP) (including IPv4 and IPv6), ICMP, Address Resolution Protocol (ARP), Internetwork Packet Exchange (IPX), and Datagram Delivery Protocol (DDP). Other layers of the OSI model include the transport layer (layer 4), the session layer (layer 5), the presentation layer (layer 6), and the application layer (layer 7). It should be noted that a network packet (or simply a packet) generally includes a header used to address the packet to a remote node or agent at the layer of the packet and a payload having a discrete quantity of information. A packet addressing an agent at one layer can be encapsulated within a payload of a packet at a lower layer as the original packet transits the communication layers. A packet of the link layer can also be referred to as a frame. The OSI model is a reference and some networking protocols may not strictly adhere to the seven layers of the OSI model. For example, in some embodiments, the functions of the link layer and the physical layer may be blended into a single link layer. The combination of protocols used at the different layers of the OSI model can be referred to as a protocol stack. For example, one particular protocol stack may include an IP layer and an Ethernet layer.

At 210, a static configuration can be loaded into one or more of the network devices of the network. For example, the network devices can be pre-loaded with information that is defined by a manufacturer of a respective network device or a system administrator of the network, such as an IP address, a media access control (MAC) address, a policy of the network (such as a routing protocol to use within the network), a list of authorized users for programming an access control list (ACL), whether the device is connected to a multipath set, a threshold number of paths for a multipath set, communication credentials, and/or other configuration information used to program the network device.

At 220, the network devices of the network can acquire and authenticate their peers. A peer (also referred to as a neighbor or a directly connected neighbor) of a network device can be a device that is connected to the network device by a network link without any intermediary devices between the network device and the peer device. Acquisition and authentication can include establishing a connection with the peer, exchanging informational packets with the peer, and authenticating that the peer is authorized to participate in the routing protocol. For example, the routing protocol can use a reliable transport such as transmission control protocol (TCP) to exchange routing information, and acquiring a peer can include establishing a TCP connection. The routing protocol can exchange different message types at different points of the flow 200. As a specific example, an open message type can be used to initialize communication between peer devices. The open message type can include information that uniquely identifies the sender of the packet (such as an address of the sender), timer values specifying a maximum amount of time between successive messages, and other parameters that are used for acquiring and authenticating peer devices.

At 230, the network devices of the network can participate in discovery. Discovery is the process for the network devices to acquire the information used to create forwarding tables of the network devices that are used to forward traffic through the network. Discovery can include exchanging information about the organization, properties, and/or connectivity of the network and creating forwarding information for traffic transiting the network. The information can be exchanged using announcements (e.g., update packets) that are broadcast to all peers or transmitted to specific peers. The network can be represented by a graph, where nodes of the graph represent network devices and edges of the graph represent links between the network devices. The nodes can be associated with one or more prefixes. The edges can have a weight (also referred to as a cost or distance) representing the desirability of routing a packet over the link. During discovery, a lowest-cost path can be identified for routing packets through the network from one prefix to a different prefix. Lower cost paths can be preferable over higher cost paths when forwarding traffic through the network. Multipath sets can be identified during discovery and properties associated with the multipath sets (such as a threshold capacity for the multipath set) can be identified. Discovery can be an iterative distributed process going through multiple transitory states as routing information is exchanged between the different devices and updated on the respective devices.

The discovery can be performed by a distributed routing protocol, such as a distance-vector protocol or a path-vector protocol. A specific example of a distance-vector protocol is the Routing Information Protocol (RIP). Generally, a network device using a distance-vector algorithm constructs a vector (e.g., a one-dimensional array) containing a cost for traveling to all of the nodes of the network. The vector can be distributed to the peers of the network device in an iterative fashion until there are no more changes to the vector. As a specific example, the vector can initially contain only the cost for traveling to the immediate peers of the network device. As the network device receives updates from the immediate peers for the cost of traveling to the peers of the immediate peers, the vector can continue to be updated with the costs of traveling to more peers that are farther away within the network. The forwarding tables for the network device can include an entry for each respective destination that is reachable from the network device. The entry can include the destination, a cost for traveling to the destination, and a next-hop to take to the destination. The next-hop refers to the peer device that is along the lowest-cost path to the destination. Thus, a distance-vector protocol can have incomplete information about routing paths between destinations, but can forward traffic to a path of least cost using cost and next-hop information stored in the forwarding table.

Generally, a network device using a path-vector protocol algorithm constructs an array containing a cost for traveling to all of the nodes of the network, and a path for travelling to each of the nodes. A specific example of a path-vector protocol is the Border Gateway Protocol (BGP). The BGP protocol can be used to build routing information within a network administered by a single entity (e.g., using interior BGP) or the BGP protocol can be used to build routing information between networks administered by different entities (e.g., using exterior BGP). The array can be distributed to the peers of the network device in an iterative fashion until there are no more changes to the array. As a specific example, the array can initially contain only the cost and paths for traveling to the immediate peers of the network device. As the network device receives updates from the immediate peers for the cost of traveling to the peers of the immediate peers, the array can continue to be updated with the costs and paths of traveling to more peers that are farther away within the network. The forwarding tables for the network device can include an entry for each respective destination that is reachable from the network device. The entry can include the destination, a cost for traveling to the destination, and a path (including the next-hop) to take to the destination. Thus, a path-vector protocol can have more complete information about routing paths between destinations as compared with distance-vector protocols.

The forwarding tables of a path-vector or distance-vector protocol can be augmented with additional attributes associated with a routing prefix so that forwarding tables can include additional information about the routing paths. For example, the attributes can include an indicator for whether the path includes a multipath route, an identifier for a particular multipath route, a status of a multipath route, and other information associated with a given prefix.

At 240, discovery is complete and the network can enter a maintenance phase. During the maintenance phase, the network devices can exchange messages (e.g., keep-alive messages) indicating that the network devices continue to be operational. If a given network device fails to receive a keep-alive message from a peer device, the given network device can determine that the peer device or the link connecting the given network device to the peer device is no longer operational. When a link or a network device fails, the forwarding tables can be updated to reflect the failure. The failure can cause some prefixes to become unreachable from the given network device or the failure can cause the carrying capacity between the given network device and a prefix to be reduced. The reduction in capacity and/or the unreachability of a prefix can be announced to peer devices of the given network device using update packets so that traffic can potentially be rerouted in response to the changes. Thus, the maintenance phase can use a combination of keep-alive messages an update packets to keep the operational status of the network up-to-date and each of the individual network devices.

FIG. 3 illustrates an example routing protocol packet format. Specifically, a routing protocol packet can include a header 300 and a body 320. The packet can be implemented at different layers of the OSI model and encapsulated in packets at lower layers of the OSI model for transport between network devices. For example, the routing protocol can be implemented at the application layer, and routing protocol packets can be encapsulated within packets of the transport, network, data link, and the physical layers. As a specific example, the routing protocol packets can be encapsulated within TCP/IP packets.

The header 300 can include multiple fields (e.g., 310, 312, 314) for identifying properties of the routing protocol packet. The header 300 can be prepended to different bodies or to no body at all depending upon a type 314 of the packet. The marker field 310 can be used to identify the packet as being part of the routing protocol. For example, the marker field 310 can include a predefined number that identifies the packet as being part of the routing protocol. As another example, the marker field 310 can include an authentication code that is determined by a system administrator or during an initialization phase of the routing protocol. The length field 312 can indicate a length of the body following the header 300. By using the length field 312 within the header 300, the routing protocol packets can be variable length and can potentially be transmitted using less bandwidth than if the routing protocol packets were a fixed length.

The type field 314 can be used to indicate a type of the routing protocol packet. As one example, the type field 314 can use different values to represent different types of packets. For example, the types of routing protocol packets can include: an open type for initializing communication between the peer devices; an update type for announcing attributes and/or routing information associated with one or more prefixes; a notification type for responding to a routing protocol packet sent with an error (such as a transmission error); a keep-alive type for indicating that a given network device is operational; and a refresh type for requesting re-advertisement of routing information from a peer device.

The body 320 can be categorized into two different sections, where the first section (including 322 and 324) indicates information to be removed from the forwarding tables and the second section indicates information to be updated or added (including 330, 332, and 334) to the forwarding tables. In alternative embodiments, the information to be removed can be sent using a first packet type, and the information to be added are updated can be sent using a different packet type. Destinations can be withdrawn due to failures and/or maintenance occurring on a path to the destination from a given network device. For example, the destination can become unreachable from the network device due to the link failure. The withdrawn length field 322 can be used to determine a length of the withdrawn destination field 324. By specifying the length of the withdrawn destination field 324, a variable number of destinations can be removed using a single routing protocol packet. Each of the withdrawn destinations can be specified using a pair including a length of the withdrawn prefix and a value of the withdrawn prefix.

The path attribute length field 330 can indicate a length of the path attribute field 332 and the reachable destinations field 334. The path attribute field 332 can include multiple attributes, where a respective attribute can be encoded to include a type of the respective attribute, a length of the respective attribute subfield, and a value for the respective attribute. For example, the types of attributes can include: an identifier of the source of the path information; a next-hop to use for a prefix; a weight associated with the prefix; a preference for routing to the prefix; an identifier of a multipath set associated with the prefix; an operational state of a multipath set; a measure of carrying capacity (e.g., bandwidth) of the path to the prefix; and other various types of information associated with the paths identified in the reachable destinations field 334. The reachable destinations field 334 can list all of the destinations (e.g., prefixes) that are reachable from the network device and having the attributes advertised in the path attributes field 332. Each of the reachable destinations can be specified using a pair including a length of the reachable prefix and a value of the reachable prefix.

FIG. 4 is a system diagram showing an example microarchitecture of a network device 400. The network device 400 can include hardware, software, or a combination of hardware and software. Generally, the network device 400 can be used for routing network traffic from one network device to another network device. In particular, network packets can be received on the input ports 410A-410C and forwarded to the output ports 420A-420C via the internal routing fabric 430. Each of the input ports 410A-410C can be paired with one of the output ports 420A-420C so that the network device 400 can both receive and transmit packets to its neighboring devices. As a specific example, the input port 410A can be paired with the output port 420A and the ports can be connected to a single peer device. The network device 400 can include control plane functions 440 used for configuring the network device 400 and neighboring network devices, and data plane functions 450 used for making forwarding decisions for packets transiting the network device 400. It should be noted, that while the network device 400 is illustrated as a three-port network device (including three input ports and three output ports), more or fewer ports are possible.

Each of the input ports 410A-410C (also referred to as input port 410) can include circuitry for receiving network traffic from a wired or wireless link. The input port 410 can include physical and link layer logic for communicating with other network devices using the physical and link layers of the OSI model. The input port 410 can also include error correcting logic for detecting and potentially correcting communication errors. The input port 410 can include buffering for receiving network packets. The input port 410 can include decode logic for decoding packet headers at the physical, data link, and network layers. The decoded fields of the network packets can be used by the input port 410 to determine whether the network packets are control packets to be handled by the control plane functions 440 or data packets to be handled by the data plane functions 450. The control packets may be consumed by the network device 400 and used to configure the network device 400. For example, the control packets can be used to program the forwarding/routing tables 460. The data packets can be dropped and/or forwarded out the output ports 420A-420C using the data plane functions 450 and the forwarding/routing tables 460. The network packets can be completely received and buffered (e.g., store-and-forward) and/or partially received and buffered (e.g., cut-through) before the network packets are forwarded to the output ports 420A-420C.

The internal routing fabric 430 can include a crossbar switch or crossbar-like-switch routing matrix that connects the different input ports 410A-410C to the different output ports 420A-420C so that any input port 410A-410C can be connected to any output port 420A-420C. The data plane functions 450 can be used to control the routing of network packets through the internal routing fabric 430 and between the input ports input ports 410A-410C and the output ports 420A-420C. The output ports 420A-420C (also referred to as output port 420) can include circuitry for transmitting network traffic over a wired or wireless link. The output port 420 can include physical and link layer logic for communicating with other network devices using the physical and link layers of the OSI model. The output port 420 can also include logic for generating error correcting codes for each of the outgoing packets so that transmission errors can potentially be detected. The output port 420 can include buffering for receiving network packets that are to be transmitted from the output port 420 to a peer device.

The control plane functions 440 can include routing protocol logic 442, path selection logic 444, and multipath capacity management logic 446. The routing protocol logic 442 can implement a distance-vector and/or a path-vector distributed routing protocol. For example, the routing protocol logic 442 can generate packets (e.g., open, update, and keep-alive packets) of the routing protocol to be transmitted from the network device 400 and can analyze packets of the routing protocol to be consumed by the network device 400. The routing protocol logic 442 can maintain a state machine that tracks a state for each of the neighboring devices based on the received routing protocol packets. As one example, the routing protocol logic 442 can be used to establish communication within neighboring network device so that routing information can be exchanged. Specifically, the routing protocol logic 442 can detect that a peer network device has transmitted an open packet to one of the input ports 410A-410C. The routing protocol logic 442 can respond to the open packet by transmitting an open packet from one of the output ports 420A-420C corresponding to the peer network device. The received open packet can include a hold time that can be used by the routing protocol logic 442 to determine when to send a keep-alive packet to its neighbor. Prior to the hold timer expiring, a keep alive packet can be transmitted from one of the output ports 420A-420C. The routing protocol logic 442 can also track a time between keep-alive packets that are received from a given neighbor. When the keep-alive packet is received from the given neighbor, a timer associated with the given neighbor can be restarted. If a keep alive packet is not received before the timer expires, the routing protocol logic 442 can determine that communication with the neighbor has been disrupted. When the neighbor is no longer reachable, the control plane functions 440 can perform various actions, such as adjusting the forwarding/routing tables 460. As another example, the routing protocol logic 442 can receive and transmit update packets based on changes to the forwarding/routing tables 460 of the network device 400 or of the neighboring network devices.

The path selection logic 444 can be used to generate a lowest-cost path for a given prefix based on update packets that are received from neighboring devices. The lowest-cost path for a given prefix can be determined using various algorithms, such as the Bellman-Ford algorithm or the Ford-Fulkerson algorithm. The lowest-cost path for a given prefix can include paths via a multipath set. The multipath set can include redundant paths that are architected to increase availability and/or bandwidth for network traffic. However, when one or more of the redundant paths are not functional, the actual bandwidth for the traffic can be less than the architected bandwidth. The multipath capacity management logic 446 can track capacity through the multipath sets and when the capacity for a given multipath set is less than a threshold capacity, a preference for the given multipath set can be reduced so that the network traffic is less likely to be forwarded across the given multipath set.

The forwarding/routing tables 460 can include information for forwarding network packets and/or for managing routing paths of a network. The forwarding/routing tables 460 can include a single data structure containing both forwarding and routing information or the forwarding/routing tables 460 can include multiple data structures where the forwarding and routing information are stored in different data structures. As one example, the forwarding/routing tables 460 can include entries for the different prefixes that are reachable from the network device 400. In particular, a given entry of the forwarding/routing tables 460 can include fields such as a prefix field 461, an attributes field 462, a next-hops field 463, a path field 464, a multipath set field 465, a threshold field 466, and a threshold-crossed field 467. The prefix field 461 can include a value of a given routing prefix that is reachable from the network device 400. The attributes field 462 can include properties about the path associated with the given prefix 461. For example, the attributes field 462 can indicate whether there is a multipath set within the path from the network device 400 to the prefix 461. The attributes field 462 can include a cost or weight associated with forwarding a packet to the prefix 461. The attributes field 462 can indicate whether the path 464 is a preferred path or a path that is not preferred. The next-hops field 463 can indicate which neighboring network devices can be used for packets destined for the prefix. Specifically, the next-hop field 463 can indicate one or more output ports 420A-C that can be used to transmit a packet that is addressed to the prefix 461. Multiple output ports 420A-C can be identified for a given prefix 461, such as when the different output ports 420A-C are connected to a different neighboring devices within a tier or other structure of the network. For example, the outgoing packets to a given prefix can be routed using an equal cost multipath (ECMP) algorithm that selects a particular output port from the set of possible output ports 420A-C based on a value calculated using a hash algorithm on one or more fields of the packet. As another example, the outgoing packets to a given prefix can be routed using a weighted multi-path routing decision based on an amount of capacity, rather than ECMP. The path field 464 can indicate one or more paths from the network device 400 to the prefix 461. The multipath set field 465 can indicate whether the path to the prefix 461 includes a multipath set and an identifier associated with the multipath set. The threshold field 466 can indicate a number of paths out of a multipath set that are desired to be operational for the multipath set. For example, the threshold number of paths can be compared to the operational number of active paths and forwarding decisions can be based on the comparison. The threshold-crossed field 467 can indicate whether the number of active paths are greater than or equal to the threshold number of paths.

The data plane functions 450 can use the information stored in the forwarding/routing tables 460 to drop and/or forward packets from the input ports 410A-C to the output ports 420A-C. Specifically, the forwarding logic 452 can identify a destination address (e.g., a layer-3 or network-layer address) of a particular packet and match the destination address to a prefix stored in the forwarding/routing tables 460. The matching entry from the forwarding/routing tables 460 can be used to provide a next-hop (e.g., an output port) for the particular packet. The security logic 454 can include an access control list (ACL) to block or allow a particular packet to be transmitted from the network device 400. The access control list can also indicate access rules for accessing control plane functions 440 of the network device 400.

FIG. 5 illustrates an example network 500 including a network device 520 that is connected to a network device 510, and the network device 510 is connected to multiple peer devices 501-504 that have different respective paths (not shown) to a given routing prefix (e.g., Prefix A). As a first example, the network 500 can be used to illustrate how, in network device 510, a comparison of an active number of paths to a threshold number of paths can be used to potentially ease congestion in the network 500 as the paths to prefix A are discovered. In this example, the carrying capacity of the link 521 can be greater than the carrying capacity of the links 511-514. For example, the link 521 can include multiple links aggregated together so that the carrying capacity of the link 521 is three or four times the individual carrying capacities of each of the links 511-514. The links 511-514 can be categorized as part of a multipath set 530 that includes all of the active paths from the network device 510 to the prefix A. A threshold (e.g., three links or 75% of the links) can be associated with the multipath set 530. During the steady-state condition when the reachability of prefix A is configured in all network devices, the network traffic can be divided among the active network links 511-514 using an ECMP algorithm so that each of the active network links 511-514 carries a portion of the network traffic (e.g., each link can carry 25% of the traffic).

However, during discovery or other transitory events, the reachability of prefix A can propagate from network devices closer to prefix A to network devices farther from prefix A. The respective paths from the individual network devices 501-504 to the prefix A can vary so that each of the individual network devices 501-504 can be updated with the path to prefix A at different times. For example, the network device 501 can be the first network device to receive path information to prefix A and the network device 501 can announce the path to prefix A by sending an update packet over link 511 to the network device 510. At this point in time, one-fourth of the capacity is available between the network device 510 and the prefix A. If the network device 510 were to send an update packet over the link 521 to the network device 520 announcing the reachability of prefix A, then the link 511 could potentially be congested because the link 521 has greater capacity than the link 511 and packets could be dropped due to the congestion. However, the network device 510 can wait to send an update packet announcing the reachability of prefix A to the network device 520 until the threshold number of paths for the multipath set 530 are operational. Alternatively, the network device 510 can send an update packet announcing the reachability of prefix A to the network device 520, and the update packet can include an attribute that reduces the preference (e.g., increases a weight) for forwarding traffic to prefix A through the network device 510. Thus, the network device 520 may route network traffic to prefix A via a different path than through the network device 510.

The network device 502 can be the next device to receive path information to prefix A causing the network device 502 to send an update packet over link 512 to the network device 510 announcing the reachability of prefix A via the link 512 and network device 502. At this point in time, only two links of the multipath set 530 are operational and so the network device 510 can wait to send an announce packet to the network device 520 until the threshold number of paths of the multipath set 530 are operational. When the network device 503 receives path information to prefix A, the network device 503 can send an update packet over link 513 to the network device 510 announcing the reachability of prefix A. Now the number of operational paths in the multipath set 530 matches the threshold number of paths and so the network device 510 can send an update packet to the network device 520 announcing that the prefix A is reachable from the network device 510. If an earlier update packet was sent with an attribute that reduced the preference for forwarding traffic to prefix A through the network device 510, a new update packet can be sent that increases the preference for forwarding traffic to prefix A through the network device 510. In this manner, traffic to the prefix A can be blocked from transiting the network device 510 until multiple network devices connected to the links of the multipath set 530 are operational so that traffic through the network device 510 is less likely to be congested and packet loss is less likely to occur.

As a second example, the network 500 can be used to illustrate how, in the network device 510, a comparison of an active number of paths to a threshold number of paths can be used to potentially reduce or prevent packet loss in the network 500 when the path to prefix A becomes unreachable downstream from the network devices 501-504. In particular, when the path to the prefix A becomes unreachable, each of the network devices 501-504 may receive information about the unreachability at different times. For example, all of the network devices 502-504 can initially include information indicating that the prefix A is reachable. The network device 501 can be the first device to be updated with the unreachable status of prefix A and the network device 501 can send an update packet to the network device 510 indicating that prefix A is not reachable (e.g., prefix A is to be withdrawn) from the network device 501. The network device 510 can determine that the prefix A is reachable from the multipath set 530 and that three paths (e.g., links 512-514) of the multipath set 530 are available. Since the number of operational paths of the multipath set 530 is greater than or equal to the threshold number of paths for the multipath set 530, network traffic can continue to flow across the multipath set 530 through the operational network links. When the next network device (e.g., the network device 502) is informed that prefix A is unreachable, the network device 502 can send an update packet to the network device 510 indicating that prefix A is unreachable. The network device 510 can determine that the number of operational paths is less than the number of threshold paths and so the network device 510 can send an update packet to the network device 520 indicating that either the prefix A is unreachable from the network device 510 or that the network device 510 is to be de-preferred when sending traffic to prefix A. Thus, traffic flowing through the network device 510 to the prefix A can potentially be stopped sooner than if the comparison of the number of operational paths to the number of threshold paths were not made (since the network devices 503 and 504 continue to show that the prefix A is reachable through them). By reducing the preference for traffic to prefix A rather than indicating that prefix A is unreachable, some traffic can still flow through the network device 510 to the prefix A, such as if there is no other path in the network to the prefix A.

FIG. 6 illustrates an example network 600 including a network device 611 connected to multiple peer devices (e.g., network devices 641-644 of a tier 640) that have paths to routing prefixes B and C (via network devices 620 and 630, respectively). The network device 611 can be part of a Clos or other high-radix network 610 having two tiers of network devices, where each of the tiers is connected by a full or partial mesh. Specifically, the network device 611 can be connected to the network devices 612-615. In this example, the number of parallel links from one tier to the next tier can be architected to have four links and a threshold number of links can be specified to be three links. At a given snapshot in time, all of the links can be operational except for link 651. For example, the network device 643 can be de-preferenced from the device 611, such as when the network device 643 is undergoing maintenance. Thus, the number of active links in the multipath set 650 is equal to the threshold number of links (e.g., three links).

The link 621 of the multipath that 625 can become nonoperational, such as when the link 621 fails. When the link 621 fails, there are three active links within the multipath set 625 which matches the threshold number of three links. However, the prefix B is no longer reachable from the network device 641. Thus, the network device 641 can send an update packet to the network device 611 announcing that the prefix B is no longer reachable. For the prefix B, the network device 611 has only two active paths for sending traffic to the prefix B. Specifically, the network device 611 can only send traffic to prefix B using the network devices 642 and 644 since there are non-operational links connected to the network devices 641 and 643 in the path between the network device 611 and prefix B. The network device 611 can determine that the number of active links associated with prefix B is less than the number of threshold links and so the network device 611 can send updates to its peer devices indicating that traffic to the prefix B through the network device 611 is to be de-preferenced. Specifically, the network device 611 can send update packets to the network devices 612-615 with an attribute associated with the prefix B that indicates traffic to the prefix B through the network device 611 is to be de-preferenced. Thus, the network devices 612-615 can forward traffic to the prefix B using a path that does not include the network device 611. It should be noted that traffic from the network device 611 to the prefix C can continue to flow normally. Specifically, there are three active paths between the network device 611 to the prefix C which matches the threshold for the multipath sets 650 and 635. Thus, by comparing the active paths associated with a given prefix to a threshold number of paths, the traffic through the network 600 can potentially be managed at the granularity of a prefix in near-real-time using a distributed routing protocol without administrator or external system interaction.

FIG. 7 illustrates an example network 700 including a network device 711 connected to multiple peer devices (e.g., network devices 741-744 of a tier 740) that have a path to a given routing prefix (via network devices 720 and 730, respectively). The network device 711 can be part of a Clos or other high-radix network 710 having two tiers of network devices, where each of the tiers is connected by a full or partial mesh. Specifically, the network device 711 can be connected to the network devices 712-715 using separate respective ports of the network device 711. The prefix B can be reached by two different equidistant paths from the network device 711. The first path can traverse the tier 740, the network device 720, and an interconnection network 740. The second path can traverse the tier 740, the network device 730, and the interconnection network 740. In this example, an amount of compound capacity between the tier 740 and the prefix B is architected to be eight links and a threshold amount of capacity can be specified to be six links or 75% of the architected capacity. The amount of capacity between the tier 740 and the prefix B can be propagated to the network device 711 using attributes associated with the prefix B. Specifically, the attribute can represent a number of links that are available to the prefix. For example, update packets can be sent from each of the network devices of the tier 740 indicating that two links are operational for the prefix B. Specifically, the two links correspond to the paths connecting the network devices 720 and 730, respectively. The threshold number of links associated with prefix B can be specified to be six links at the network device 711.

At a given snapshot in time, all of the links can be operational except for link 751 of the multipath set 750. For example, the network device 741 can be de-preferenced for the device 711, such as when the network device 741 is undergoing maintenance. Specifically, there are zero active links between the network device 711 and the network device 741. A count of the active links between the network device 711 and the network device 741 can be performed in various ways. For example, the network device 741 can send an update packet to the network device 711 indicating that the network device 741 is being de-preferenced. As a specific example, the network device 741 can send an update packet to the network device 711 prepending itself to the path of prefix B so that it will not be selected as an active path of the multipath set 750 (since the path to prefix B through the network device 741 will appear longer than the paths through the network devices 742-744). As another example, the network device 741 can send an update packet to the network device 711 indicating either that the prefix B is unreachable or that the prefix B is reachable but with the link-count attribute of zero (indicating that there are zero links available). Additionally or alternatively, the network device 711 can detect that the network device 741 is no longer in communication (e.g., a keep-alive packet was not received from the network device 741), and attributes associated with the network device 741 can be adjusted (e.g., link-count attributes can be zeroed for all prefixes reachable through the network device 741). When the link 751 is unavailable, the number of active links in the multipath set 750 is equal to the threshold number of links (e.g., six links).

The link 731 can become nonoperational, such as when the link 731 fails. The network device 742 can detect that the link 731 failed, can adjust a link count attribute associated with the prefix B, and can send an update packet to the network device 711 with the adjusted attribute showing that the link-count attribute associated with the prefix B is now one. In response to receiving the update packet, the network device 711 can update a count of the links associated with prefix B and determine that there are five active links which is less than the threshold number of six active links. Thus, the network device 711 can de-preference itself as a next-hop towards prefix B for the network devices 712-715.

Specifically, the network device 711 can send update packets to each of the network devices 712-715 indicating that it is de-preferred for the prefix B. In this manner, congestion can potentially be mitigated for multi-home prefixes having equidistant redundant paths which may be in different operational conditions.

As another example, the link attributes associated with the prefix B can represent a capacity or bandwidth of downstream links. For example, the links in the multipath sets 750, 725, and 735 can include aggregated links that can operate at different speeds. As a specific example, each of the links in the multipath sets 725 and 735 can be architected to transmit traffic at a rate of two gigabits per second (Gbps) in each of the links, and the multipath set 750 can be architected to transmit traffic at a rate greater than or equal to four Gbps. When all of the links are operational, the network devices of the tier 740 can announce that there are four Gbps of capacity from the respective network devices of the tier 740. In particular, an update packet can be sent from each of the network devices of the tier 740 to the network device 711 announcing the reachability of prefix B and having a capacity-attribute indicating that there is four Gbps of capacity to the prefix B. However, if the link 731 is reduced in capacity (such as if one of the aggregated links fails), the network device 742 can detect the reduction in capacity and can modify the attribute associated with the prefix B. In response, the network device 742 can send an update packet to the network device 711 indicating that the prefix B has a modified attribute. Specifically the modified attribute can indicate that there is only three Gbps of capacity associated with the prefix B.

The threshold associated with prefix B and stored at the network device 711 can be specified to be 12 Gbps. Thus, prior to the link 731 being reduced in capacity, the active links can carry 12 Gbps and the threshold is met. However, after the link 731 is reduced in capacity, there is only 11 Gbps associated with the prefix B and so the network device 711 can send an update packet to each of the respective network devices 712-715 indicating that the network device 711 is to be de-preferred for traffic addressed to the prefix B.

Example Methods for Managing Routing Resources of a Network

Figure 8:
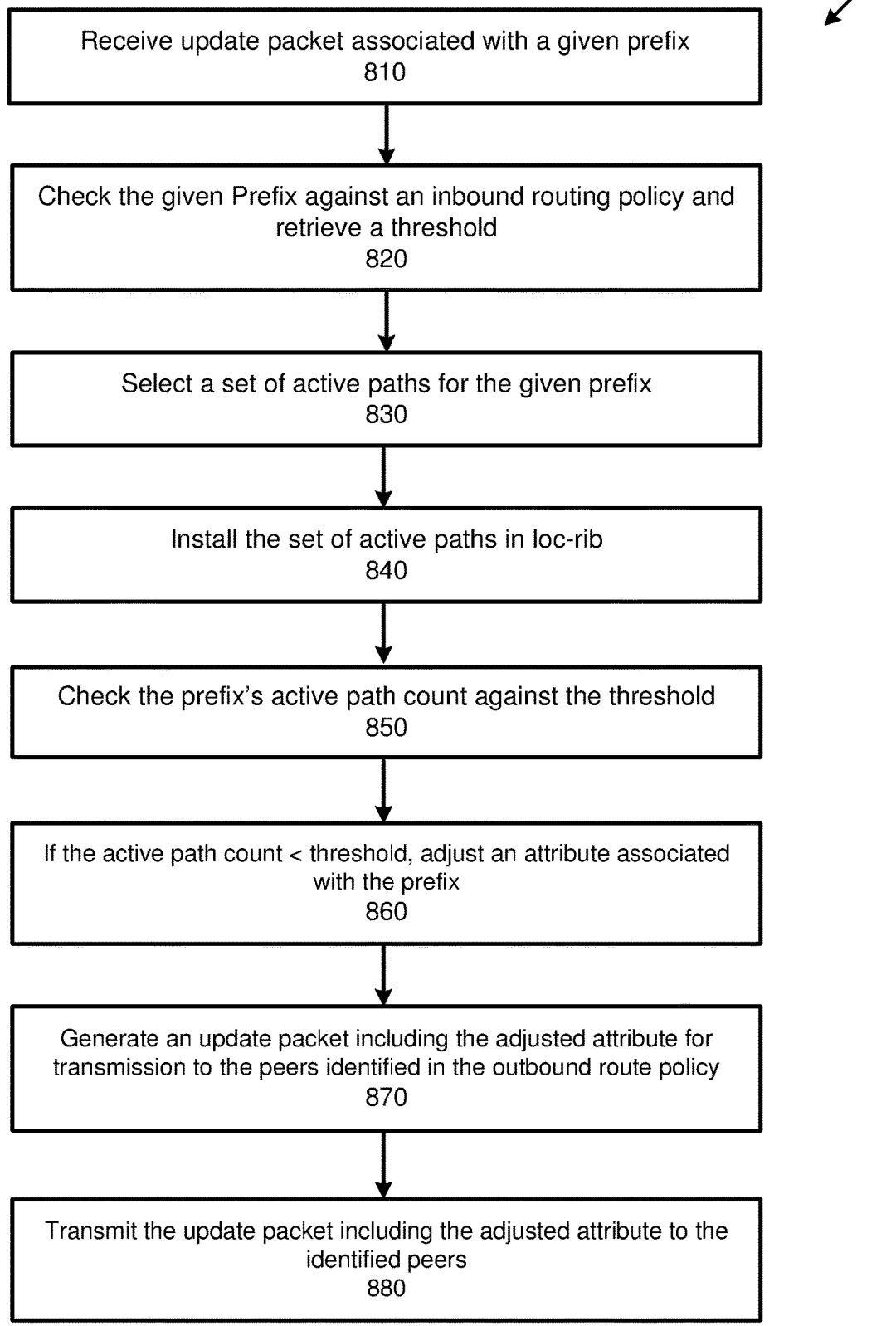
FIG. 8 is an example workflow diagram illustrating a workflow for a network device.

FIG. 8 is an example workflow diagram illustrating a workflow 800 for a network device. As one example, the method 800 can be implemented using a network device architected as described above with reference to FIGS. 1-7. The workflow 800 can be implemented using software, hardware, or a combination of hardware and software. At 810, an update packet can be received that is associated with a given prefix. For example, the update packet can be a packet of a distributed routing protocol, such as a distance-vector routing protocol or a path-vector routing protocol. As a specific example, the update packet can be a BGP packet. The update packet can include one or more attributes that are associated with the given prefix.

At 820, the given prefix can be checked against an inbound routing policy (such as a route map). For example, it can be determined whether the given prefix was configured as reachable from the network device prior to the update packet being received. If the given prefix was known to be reachable, then an entry in the routing tables is present. However, if the given prefix was not known to be reachable prior to receiving the update packet, a new entry in the routing tables can be added for the given prefix. It can be determined whether the given prefix belongs to the multipath set. For example, an attribute of the update packet can indicate that the prefix can be reached via a particular multipath set. As another example, the ports associated with multipath sets can be preconfigured on the network device. A threshold can be associated with the multipath set and stored in the entry for the prefix and the inbound route map. The threshold can be retrieved from the inbound route map.

At 830, a set of active paths can be selected for the given prefix. For example, the Bellman-Ford algorithm or the Ford-Fulkerson algorithm can be used to determine the active paths for the given prefix. At 840, the set of active paths can be installed in a routing table maintained by the routing protocol. As a specific example, the prefix can be installed in the "loc-rib" table that is maintained by the BGP routing protocol. By installing the set of active paths in the routing table, an entry is added corresponding to the given prefix and information associated with the given prefix can be stored within the entry. For example, the active paths, next-hop, threshold, and/or other attributes associated with the prefix can be stored within the entry. At 850, the prefix's active path count (e.g., an ECMP count) can be compared to the threshold associated with the prefix. It should be noted, that while 840 and 850 are illustrated as occurring in series, 840 and 850 can occur in a different order or in parallel.

At 860, if the active path count is less than the threshold, an attribute associated with the prefix can be adjusted. For example, if the count is less than the threshold, the attribute can be adjusted to indicate that the network device is to be de-preferred. At 870, an update packet can be generated for transmission to the neighbors listed in an outbound routing policy (e.g., an outbound route map). The update packet can include the adjusted attribute. At 880, the update packet with the adjusted attribute can be transmitted to peers of the network device.

Figure 9:
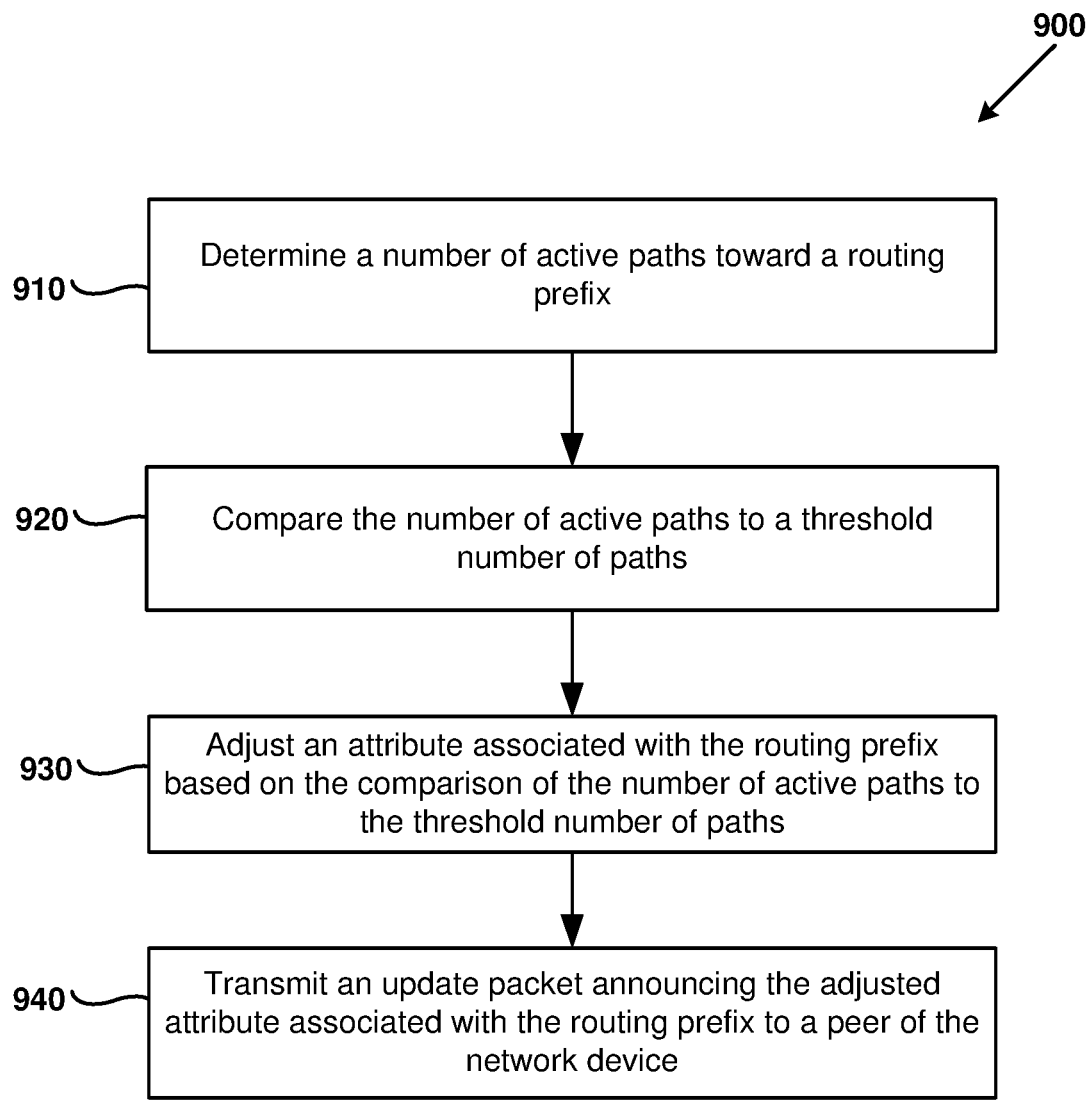
FIG. 9 is a flow diagram of an example method of managing routing resources of a network.

FIG. 9 is a flow diagram of an example method 900 of managing routing resources of a network. As one example, the method 900 can be implemented using a network device architected as described above with reference to FIGS. 1-8. In particular, the method 900 can be implemented using software, hardware, or a combination of hardware and software.

At 910, a number of active paths toward a routing prefix can be determined. As one example, determining the number of active paths toward the routing prefix can include receiving update packets associated with the prefix and counting a number of origins of the update packets associated with the prefix. For example, the origins can be different network devices or different ports of a given network device. The active paths can include the operational links directly connecting the network device to its neighboring network devices. Additionally or alternatively, the active paths can include the operational links connecting the network device to downstream network devices that are not directly connected to the network device. The active paths can be selected by the network device based on a policy of the network device and/or of the network. As one example, the active paths can be the lowest-cost paths from the network device to the routing prefix.

At 920, the number of active paths can be compared to a threshold number of paths. The threshold number of paths for a particular prefix can be configured before an initial peer acquisition and authentication phase of a routing protocol begins. As a specific example, the threshold number of paths can be configured during an initialization sequence when the network device is powered on or reset. Additionally or alternatively, the threshold number of paths for a particular prefix can be encoded as an attribute within an update packet of the routing protocol.

At 930, an attribute associated with the routing prefix can be adjusted based on the comparison of the number of active paths to the threshold number of paths. Adjusting the attribute associated with the routing prefix can include reducing a preference for the paths from the network device to the routing prefix, such as when the number of active paths transitions to less than the threshold number of paths. Adjusting the attribute associated with the routing prefix can include increasing a preference for the paths from the network device to the routing prefix, such as when the number of active paths transitions to a number greater than or equal to the threshold number of paths.

At 940, an update packet announcing the adjusted attribute associated with the routing prefix can be transmitted to a peer of the network device. For example, a format of the update packet can be specified by a routing protocol. The routing protocol can be a distance-vector or a path-vector routing protocol, such as BGP.

Figure 10:
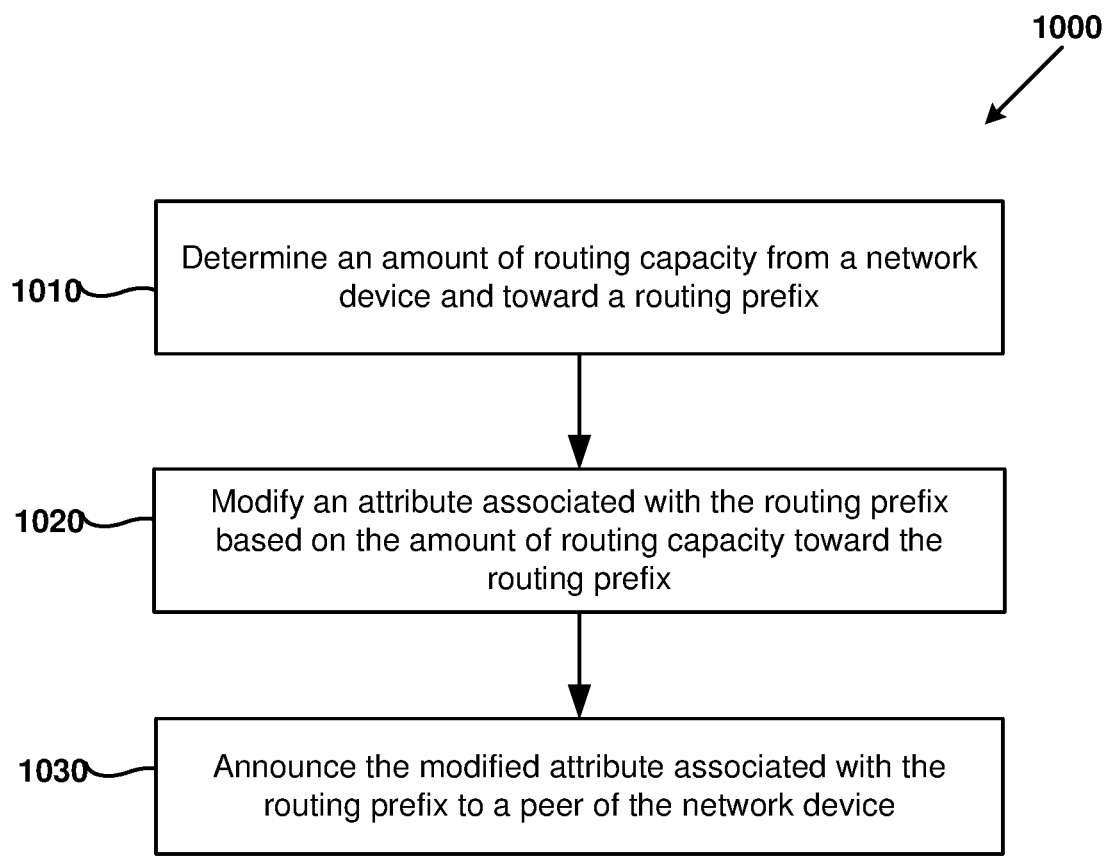
FIG. 10 is a flow diagram of another example method of managing routing resources of a network.

FIG. 10 is a flow diagram of an example method 1000 for managing routing resources of a network. As one example, the method 1000 can be implemented using a network device architected as described above with reference to FIGS. 1-8. In particular, the method 1000 can be implemented using software, hardware, or a combination of hardware and software.

At 1010, an amount of routing capacity from a network device and toward a routing prefix can be determined. The routing capacity can be a measure of active paths directly connected to the network device or indirectly connected to the network device. As one example, the amount of routing capacity can be measured by counting a number of active paths or available bandwidth toward the routing prefix. The capacity can be a measure of interface capacity to next-hops or can be extracted from an advertised capacity attribute coming from an incoming announcement. When both the number of active paths and the available bandwidth can be determined, the available bandwidth can be the preferred measure of capacity over the amount of active paths. As another example, the amount of routing capacity can be measured by counting a number of active paths from next-hop peers toward the routing prefix. As another example, the amount of routing capacity can be measured by counting a measure of bandwidth of active paths from next-hop peers toward the routing prefix. The amount of routing capacity from the network device and toward a routing prefix can be determined for a multi-path set of links from a network device to the routing prefix, where the multi-path set of links includes multiple links from the network device and the different links connect to different respective peers of the network device.

At 1020, an attribute associated with the routing prefix can be modified based on the amount of routing capacity toward the routing prefix. For example, the number of active paths toward the routing prefix can be compared to a threshold amount of paths toward the routing prefix, and the attribute associated with the routing prefix can be modified based on the comparison. The attribute associated with the routing prefix can be modified to indicate that a preference for the paths from the network device and toward the routing prefix are reduced after the number of active paths toward the routing prefix transitions below the threshold amount of paths toward the routing prefix. Alternatively, the attribute associated with the routing prefix can be modified to indicate that a preference for the paths from the network device and toward the routing prefix is increased after the number of active paths toward the routing prefix transitions above the threshold amount of paths toward the routing prefix. The attribute can be used to describe a character or property of the multipath set, such as a number of links or an amount of carrying capacity of the multipath set. The attribute describing the multipath set can be adjusted to account for the operational conditions of the links within the multipath set (such as a number of active links or an amount of operational carrying capacity).

At 1030, the modified attribute associated with the routing prefix can be announced to a peer of the network device. Announcing the modified attribute associated with the routing prefix to the peer of the network device can include transmitting a path-vector protocol update packet or a distance-vector protocol update packet. For example, a format of the update packet can be specified by an interior or exterior BGP routing protocol.

Example Computing Environment

Figure 11:
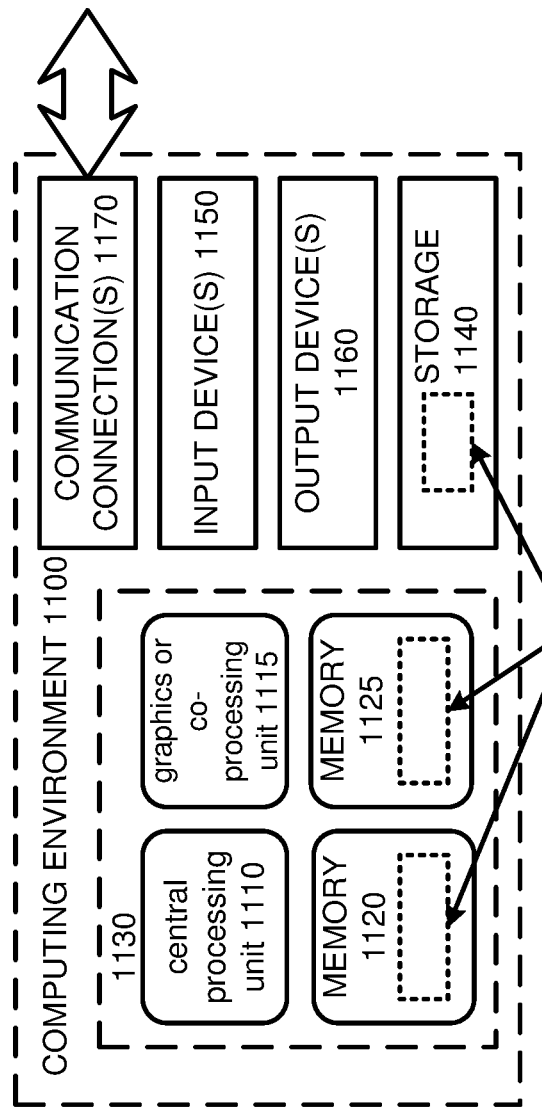
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), a processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We claim as our invention all that comes within the scope of these claims.

What is claimed is:

1. A network switch configured to:
    determine a number of active paths in a network from the network switch toward a routing prefix, wherein the number of active paths relate to a number of source network switches from which the network switch received announcements, wherein determining the number of active paths includes incrementing a count for each of the received announcements associated with a prefix, the received announcements indicating different active paths available from the source network switches to the network switch;
    compare the number of active paths to a threshold number of paths, wherein the threshold number is a constant;
    wait to transmit an update packet to a peer switch regarding a reachability of the routing prefix until the threshold number of paths is reached;
    adjust an attribute associated with the routing prefix based on the comparison when the number of active paths is equal to or greater than the threshold number of paths; and
    transmit an update packet announcing the adjusted attribute associated with the routing prefix to a peer switch of the network switch after the waiting for the threshold number of paths to be reached, wherein the update packet includes the adjusted attribute indicating that the threshold number of active paths has been reached.

2. The network switch of claim 1, wherein the update packet announcing the adjusted attribute is a Border Gateway Protocol packet.

3. The network switch of claim 1, wherein the threshold number of paths for a particular prefix is configured before an initial peer acquisition and authentication phase of the network switch begins.

4. A method comprising:
determining an amount of routing capacity in a communication network from a network device and toward a routing prefix, wherein the amount of routing capacity is based on a number of source network devices from which the network device received an announcement, wherein the determining an amount of routing capacity includes incrementing a count for each received announcement associated with a routing prefix;
waiting to transmit an update packet to a peer of the network device announcing reachability of the routing prefix until the number in the count reaches a threshold constant;
modifying an attribute associated with the routing prefix based on the amount of routing capacity toward the routing prefix, wherein the modified attribute indicates that the count has reached or exceeded the threshold constant; and
after the number reaches the threshold constant, announcing the modified attribute associated with the routing prefix to the peer of the network device by transmitting the modified attribute to the peer of the network device.

5. The method of claim 4, wherein modifying the attribute associated with the routing prefix based on the amount of routing capacity toward the routing prefix comprises comparing the number of active paths toward the routing prefix to the threshold number of paths toward the routing prefix.

6. The method of claim 5, wherein modifying the attribute associated with the routing prefix based on the amount of routing capacity toward the routing prefix further comprises reducing a preference for the paths from the network device and toward the routing prefix after the number of active paths toward the routing prefix falls below the threshold number of paths toward the routing prefix.

7. The method of claim 6, wherein the reducing the preference comprises increasing a weight for forwarding packets towards the routing prefix.

8. The method of claim 4, wherein the amount of routing capacity is measured by counting a number of active paths from next-hop peers toward the routing prefix.

9. The method of claim 4, wherein the amount of routing capacity is measured by measuring bandwidth of active paths from next-hop peers toward the routing prefix.

10. The method of claim 4, wherein announcing the modified attribute associated with the routing prefix to a peer of the network device comprises transmitting a path-vector protocol update packet.

11. The method of claim 4, wherein announcing the modified attribute associated with the routing prefix to a peer of the network device comprises transmitting a distance-vector protocol update packet.

12. The method of claim 4, wherein the network device is a network router or a network switch.

13. A computer-readable storage medium including instructions that upon execution cause a computer system to:
increment a count for each announcement received from a source device associated with a routing prefix;
generate a value of an attribute associated with the routing prefix based on a comparison of a threshold amount of routing capacity to an amount of routing capacity through a multi-path set of links from a network device to the routing prefix, wherein the value depends on a number of source devices from which announcements were received as indicated by the count;
wait for the count to reach a threshold number and block an announcement from the network device related to reachability of the routing prefix during the waiting; and
after the threshold number is reached in the count, modify the value of the attribute to reflect that the threshold number was reached and transmit a packet from the network device announcing the value of the attribute associated with the routing prefix.

14. The computer-readable storage medium of claim 13, wherein the multi-path set of links from the network device to the routing prefix comprise a plurality of links from the network device to different respective peers of the network device.

15. The computer-readable storage medium of claim 13, wherein the amount of routing capacity through the multi-path set of links is measured as a number of active links from the network device to different respective next-hops along a given path to the routing prefix.

16. The computer-readable storage medium of claim 13, wherein the value of the attribute associated with the routing prefix de-preferences the multi-path set of links from the network device to the routing prefix when the amount of routing capacity through the multi-path set of links is less than the threshold amount of routing capacity.

17. The computer-readable storage medium of claim 13, wherein the value of the attribute associated with the routing prefix increases a preference of the multi-path set of links from the network device to the routing prefix when the amount of routing capacity through the multi-path set of links is greater than the threshold amount of routing capacity.

18. The computer-readable storage medium of claim 13, wherein the packet transmitted from the network device announcing the value of the attribute associated with the routing prefix is a Border Gateway Protocol update packet.

* * * * *